Dec. 5, 1933.  B. J. UKROPINA  1,938,229
CONCRETE PIPE JOINT
Filed Feb. 16, 1931
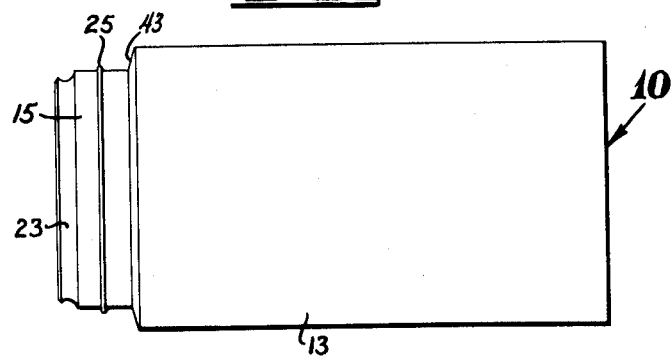
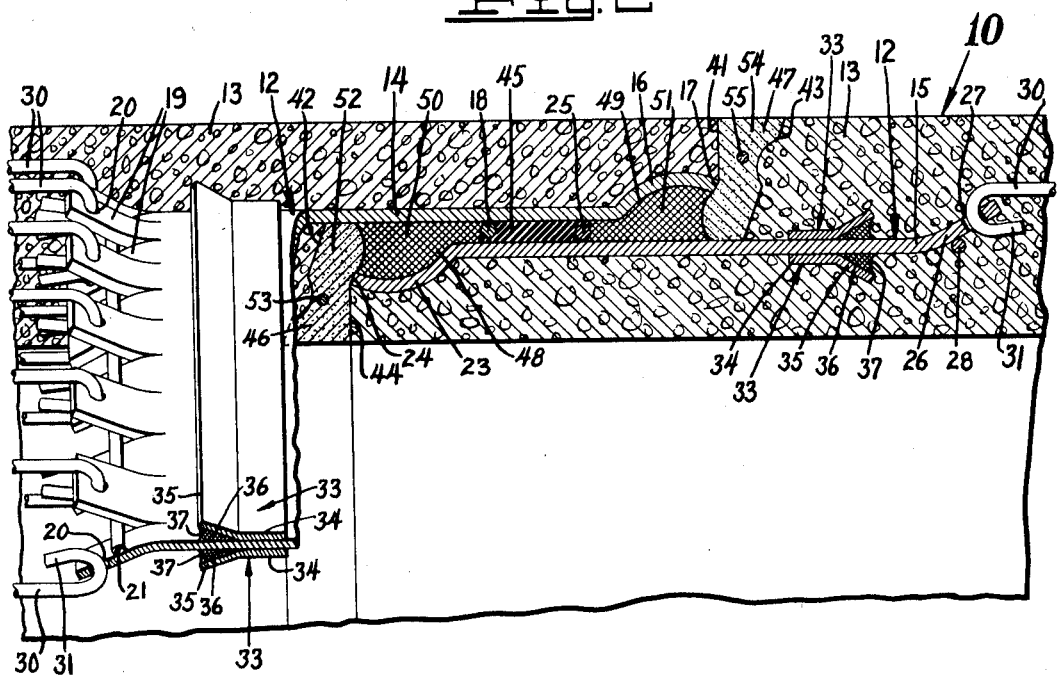
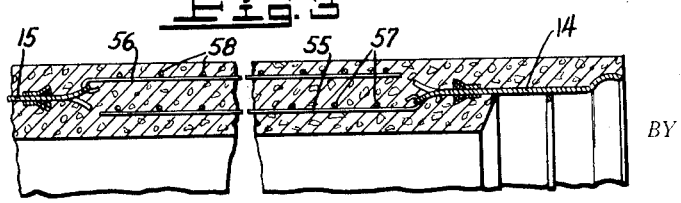
INVENTOR.
B. J. UKROPINA.
BY
B. J. Craig.
ATTORNEY.

Patented Dec. 5, 1933

1,938,229

UNITED STATES PATENT OFFICE 1,938,229

CONCRETE PIPE JOINT

Bozidar J. Ukropina, Los Angeles, Calif.

Application February 16, 1931. Serial No. 515,939

5 Claims. (Cl. 72—53)

This invention relates to improvements in concrete pipes.

The general object of the invention is to provide an improved joint for concrete pipes.

Other objects and advantages of this invention will be apparent from the following description taken in connection with the accompanying drawing wherein:

Fig. 1 is a side elevation of a concrete pipe embodying the features of my invention, and Fig. 2 is an enlarged fragmentary section through two lengths of pipe showing my improved joint construction.

Fig. 3 is a longitudinal section through my pipe showing a modification of the reinforcing cage.

Referring to the drawing by reference characters I have indicated a length of concrete pipe embodying the features of my invention generally at 10. As shown this pipe includes annular metal reinforcing members 12 embedded in concrete 13. The reinforcing members 12 include a bell ring 14 positioned adjacent one end of the pipe and a spigot ring 15 positioned adjacent the opposite end of the pipe.

The bell ring 14 adjacent the outer end thereof is provided with an outwardly bowed arcuate shoulder 16. The center of the radius of the arc of the shoulder 16 is set in from the outer end of the bell ring so that the end flares slightly inward as at 17. Adjacent the outer end of the bell ring 14 and spaced inwardly from the inner edge of the arcuate shoulder 16 I provide a ring 15 which may be a metal wire and which is secured to the inner surface of the bell ring as by welding.

The inner end of the bell ring is provided with a plurality of integral fingers 19 which are alternately bent inward and outward and each is provided with an aperture 20. Overlying the inwardly bent fingers and underlying the outwardly bent fingers I may provide a wire ring 21 which may be secured to the fingers by welding.

The spigot ring 15 like the bell ring 14, adjacent the outer end thereof, is provided with an inwardly bowed arcuate shoulder 23. The center of the radius of the arc of the shoulder 23 is set in from the outer end of the spigot ring so that the end flares slightly outward as at 24. Adjacent the outer end of the spigot ring and spaced inwardly from the inner edge of the arcuate shoulder 23 I provide a metal ring 25 which may be secured to the outer surface of the spigot ring as by welding. The inner end of the spigot ring like the bell ring is provided with a plurality of fingers 26 which are alternately bent inward and outward and are provided with an aperture 27. Overlying the inwardly bent fingers and underlying the outwardly bent fingers I provide a wire ring 28 which may be secured to the fingers as by welding.

The bell ring 14 and the spigot ring 15 are connected by a plurality of wires 30 each of which is provided with a hooked portion 31 at each end. The hooked portions 31 at one end of the wires 30 are positioned in the apertures 20 of the fingers 19 of the bell ring and the hooked portions 31 at the other ends of the wires are positioned in the aperture 27 of the fingers 26 of the spigot ring. If desired the wires 30 may be secured to the fingers 19 and 26 as by welding.

Secured to the inner and outer surface of the bell ring and the spigot ring adjacent the fingers thereof I may provide annular members 33 which include a flat portion 34 welded to the ring and an angularly arranged portion 35 which is inclined away from the ring surface to form a wedge-shaped chamber 36 in which packing material 37 is positioned. The packing material which may be of lead, rubber or asphaltum, is positioned in the chamber 36 before the reinforcing cage 12 is embedded in the concrete and when the concrete 13 is moulded or formed in position the concrete wedges the packing material tightly in the chamber 36 thereby forming a fluid tight seal between the surface of the ring and the circular members 33 so that should the concrete crack along the surface of the ring the packing material would prevent leakage.

The concrete 13 at the bell end of the pipe 10 and outside of the bell ring terminates flush with the outer end of the bell ring as at 41, while the concrete inside of the bell ring is set back from the outer end of the bell ring and beveled inwardly as at 42. The concrete 13 at the spigot end of the pipe and outside of the spigot ring is set back from the end of the spigot ring and beveled outwardly as at 43 while the concrete inside of the spigot ring terminates flush with the outer end of the spigot ring as indicated at 44.

When two lengths of the pipe 10 are joined, a resilient packing ring 45 such as rubber is positioned over the spigot ring adjacent the wire ring 25. The spigot end of one pipe is then inserted in the bell end of the adjoining pipe so that the spigot ring 15 is positioned inside of the bell ring 14 and the two pipe lengths are forced together until the resilient packing ring 25 is compressed between the wire 18 on the bell ring and the wire 25 on the spigot ring.

When the pipe lengths are in this position a chamber 46 is formed between the adjacent inner ends of the two pipe lengths and a chamber 47 is formed between the adjacent outer ends of the lengths of pipe. Furthermore a chamber 48 is formed between the inner surface of the bell ring 14 and the outer surface of the arcuate shoulder 23 of the spigot ring 15, and a chamber 49 is formed between the outer surface of the spigot ring 15 and the inner surface of the arcuate shoulder 16 of the bell ring 14. A calking material 50 which may be lead is then driven into the chamber 48 and tightly packed therein to form a fluid tight seal between the spigot ring and the bell ring and similar calking material 51 is driven into the chamber 49 and tightly packed therein to form a fluid tight seal between the bell ring and the spigot ring.

After the calking is positioned in the chamber 48 the chamber 46 is filled with a plastic material 52 such as cement mortar which may have a reinforcing member 53 embedded therein, and the chamber 47 is filled with a similar plastic material 54 which may also have a reinforcing member 55 embedded therein.

In Fig. 3 I have shown a modification of my reinforcing cage 12 wherein all of the elements thereof are similar to those previously described with the exception of the rods 30. In this modification rods 55 are connected to each alternate finger 19 of the bell ring 14 and other rods 56 are connected to each alternate finger of the spigot ring 15. Thus the rods 55 of the bell ring 14 are free from connection to the spigot ring and the rods 56 of the spigot ring are free from connection to the bell ring. As shown the rods 55 of the bell ring 14 are connected to the inwardly bent fingers 19 thereof and the rods 56 of the spigot ring 15 are connected to the outwardly bent fingers 19 thereof.

To provide further reinforcement longitudinally spaced wire rings 57 may be secured to the rods 55 and similarly spaced wire rings 58 may be secured to the rods 56.

It will be noted that my improved pipe joint allows for expansion and contraction without liability of leakage so that concrete pipe embodying the features of my invention may be used for many purposes.

From the foregoing description it will be apparent that I have provided an improved concrete pipe and pipe joint which is simple in construction and highly efficient in use.

Having thus described my invention, I claim:

1. A concrete pipe, said pipe including a bell and a spigot end, a spaced annular metal reinforcing means arranged at each end and embedded between an outer layer of concrete and an inner layer of concrete, said reinforcing means including inwardly and outwardly directed tongues, elongated reinforcing means connected to said tongues and a reinforcing member embedded in the pipe and arranged circumferentially between said tongues.

2. A concrete pipe, said pipe including annular metal spaced reinforcing members arranged at each end of the pipe and embedded between an outer layer of concrete and an inner layer of concrete, said members having tongues thereon, certain of said tongues being bent outwardly and certain of said tongues being bent inwardly and longitudinally extending reinforcing means connected to said tongues, said reinforcing means overlapping and being concentrically arranged.

3. A moulded pipe, said pipe including a spaced metal reinforcing member arranged at each end of the pipe and embedded between an outer layer of moulded material and an inner layer of moulded material, a spigot ring secured to one of said reinforcing members, said spigot ring including an extended portion having an external sealing member thereon, a bell ring secured to the other reinforcing member, said bell ring including an internal sealing member, said reinforcing members each having tongues thereon and longitudinal reinforcing means engaging said tongues, the reinforcing means on the members being independent.

4. In a concrete pipe, a reinforcing spigot member in one end of said pipe and a reinforcing bell member in the other end of said pipe, reinforcing means in said pipe, said reinforcing means including a plurality of longitudinally extending circumferentially spaced rods, some of said rods being connected to said spigot reinforcing member and free from said bell member and other of said rods being connected to said bell reinforcing member and free from said spigot member.

5. A concrete pipe, a spigot member embedded in one end of said pipe, a bell member embedded in the other end of said pipe, said bell and spigot members including joint forming portions, the inner ends of said bell and spigot members each having a reinforcing member secured thereto, the reinforcing member on said bell member being circumferentially spaced from the reinforcing member on the spigot member.

BOZIDAR J. UKROPINA.